United States Patent [19]
Shiomi

[11] Patent Number: 5,933,660
[45] Date of Patent: *Aug. 3, 1999

[54] IMAGE BLUR PREVENTION APPARATUS RESPONSIVE TO SHUTTER RELEASE AND POWER SWITCHES

[75] Inventor: Yasuhiko Shiomi, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/682,960

[22] Filed: Jul. 18, 1996

[30] Foreign Application Priority Data

Jul. 21, 1995 [JP] Japan .................................. 7-206763

[51] Int. Cl.[6] .................................. G03B 17/00
[52] U.S. Cl. .................................. 396/55
[58] Field of Search .................................. 396/52, 53, 54, 396/55; 348/208

[56] References Cited

U.S. PATENT DOCUMENTS

| | | | |
|---|---|---|---|
| 5,175,580 | 12/1992 | Shiomi | 354/410 |
| 5,541,693 | 7/1996 | Enomoto | 396/55 X |
| 5,576,787 | 11/1996 | Kai et al. | 396/55 |
| 5,615,397 | 3/1997 | Shiomi et al. | 396/55 |

*Primary Examiner*—Howard B. Blankenship
*Attorney, Agent, or Firm*—Fitzpatrick, Cella, Harper & Scinto

[57] ABSTRACT

In an image blur prevention device, an apparatus adapted thereto, an optical apparatus to which the device is applied, and the like, an operation device is used to change the image blur prevention device into a predetermined state in a first manner in accordance with a first operation (for example, to stop the image blur prevention device after the lapse of the predetermined time period in accordance with an operation of the release operation unit of a camera), and to change the image blur prevention device into the predetermined state in a second manner different from the first manner in accordance with a second operation different from the first operation (for example, to stop the image blur prevention device before the lapse of the predetermined time period in accordance with an OFF operation of the main switch of the camera), thereby improving the operability of the image blur prevention device.

22 Claims, 8 Drawing Sheets

IMAGE BLUR PREVENTION APPARATUS RESPONSIVE TO SHUTTER RELEASE AND POWER SWITCHES

BACKGROUND OF THE INVENTION

1. Field of the Invention

The present invention relates to an image blur prevention apparatus for preventing an image blur in a camera, an optical device, or the like.

2. Description of the Related Art

In a conventional image blur prevention apparatus of this type, the influence of a hand fluctuation of a photographer on an image formed on a film surface can be eliminated by the following correction operation. As shown in FIG. 8, when a release button 51 on a camera body 50 is operated, a correction optical system 56 is eccentrically driven in a predetermined direction within a plane perpendicular to the optical axis or tilted with respect to a plane perpendicular to the optical axis via independent correction driving means 54 and 55 on the basis of outputs from sensors 52 and 53 for detecting angular fluctuations about predetermined rotation axes Y (yaw) and P (pitch) shown in FIG. 8.

When the release button 51 is released, the outputs from the sensors 52 and 53 are immediately disconnected from the correction driving means 54 and 55. As a result, the correction operation of the correction optical system 56 is stopped, and image blur correction on the film surface is completed.

In the above conventional method, the correction operation of the correction optical system 56 is stopped immediately after the release button 51 is released. With this operation, for example, in a photographic mode of performing an AF operation a plurality of numbers of times by operating the release button 51 as in the case of depth-of-field-priority AE photography, since an operation of "half press→release" of the release button 51 is repeated, the process of "correction operation→correction stop" is repeated accordingly.

In a device which allows the photographer to check the actual state of an image blur prevention operation through a finder, e.g., a single-lens reflex camera, or a video camera, the influence of a hand fluctuation on an object image which can be observed through the finder decreases and increases irregularly. The resultant image exhibits great discontinuity. This makes the photographer feel a sense of incongruity.

When a correction operation is to be completely stopped, a member having a mechanical lock mechanism operates to mechanically lock the correction optical system 56. This operation, however, requires a time of several 10 to several 100 msec. For this reason, if image blur prevention is stopped immediately after the release button 51 is released, the release time lag is prolonged in a pseudo-continuous shooting operation performed by repeatedly operating the release button 51.

SUMMARY OF THE INVENTION

The present invention has been made in consideration of the above situation, and has as its object to provide an image blur prevention apparatus with improved operability.

One aspect of the invention provides an image blur prevention device, an apparatus adapted thereto, an optical apparatus to which the device is applied, and the like, in which an operation device is used to change the image blur prevention device into a predetermined state in a first manner in accordance with a first operation, and to change the image blur prevention device into the predetermined state in a second manner different from the first manner in accordance with a second operation different from the first operation, thereby improving the operability of the image blur prevention device.

Another aspect of the invention provides an image blur correction device having an image blur correction system for correcting an image blur in accordance with an output from an image blur detection device which detects an image blur state, an apparatus adapted to the device, and an optical apparatus to which the device is applied, in which an operation device is used to change a state of the image blur correction system in accordance with a predetermined operation after a predetermined time period has elapsed after the predetermined operation is performed, and not to perform the operation for changing the state of the image blur correction system until the predetermined time period has elapsed, thereby improving the operability of the image blur prevention device.

DETAILED DESCRIPTION OF THE PREFERRED EMBODIMENTS

Embodiments of the present invention will be described in detail below.

Figure 1:
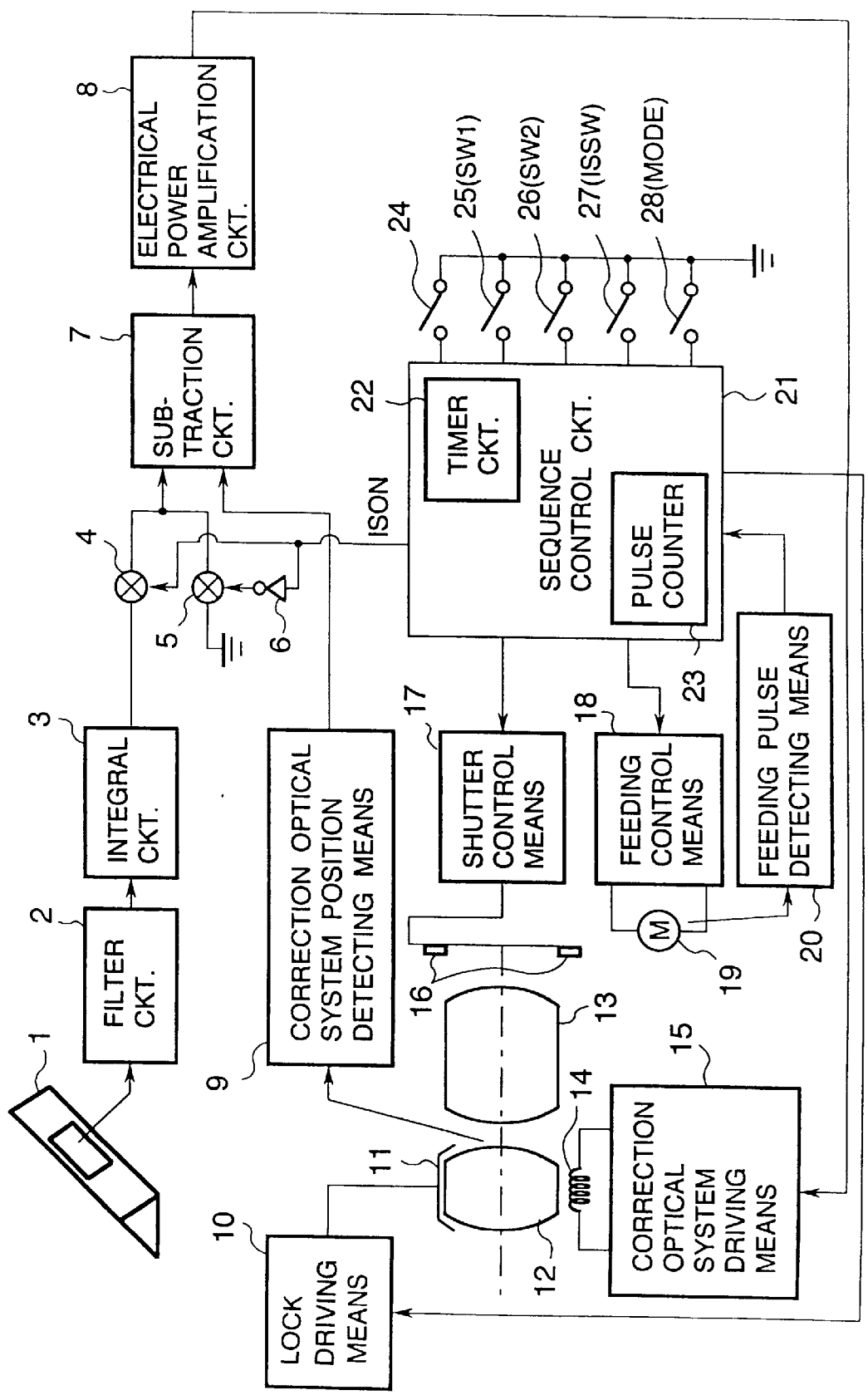
FIG. 1 is a block diagram showing the overall arrangement of a camera having an image blur prevention function according to each embodiment of the present invention.

FIG. 1 is a block diagram showing the overall arrangement of a camera having an image blur prevention function according to the first embodiment of the present invention. The overall arrangement of the camera will be briefly described below with reference to FIG. 1.

A filter circuit 2 removes unnecessary signal components from an output from a fluctuation sensor 1 (using fluctuation gyroscopes as angular velocity sensors, which are respectively arranged in yaw and pitch detecting directions as in the prior art) for detecting fluctuations of the overall camera. As a result, only the angular velocity signal component is input to an integral circuit 3 (generally constituted by an OP amplifier and a CR time constant circuit), thereby performing conversion from the angular velocity to an angle displacement. The output from the integral circuit 3 is input to a subtraction circuit 7 via an analog switch 4. The other input of the subtraction circuit 7 is connected to ground via an analog switch 5. These inputs are switched in accordance with the states of the analog switches 4 and 5 which are alternately turned on by an output ISON from a sequence control circuit 21 and an output from an inverter 6 which inverts the output ISON.

In order to actually correct a fluctuation of an image formed on an imaging plane, which is caused by movement of the photographer, this camera includes a correction optical system 12 which is arranged in front of a photographing optical system 13 or is constituted by its portion. The correction optical system 12 is driven in a predetermined direction by a correction optical system driving means 15 and a driving coil 14. The actual movement of the correction optical system 12 is detected by a correction optical system position detecting means 9. The output from the correction optical system position detecting means 9 is input to the subtraction circuit 7. When the analog switch 4 is ON, a subtraction with an output from the integral circuit 3 is performed. When the analog switch 5 is ON, a subtraction with a ground input, i.e., a non-signal input, is performed. The output from the subtraction circuit 7 is amplified by an electrical power amplification circuit 8 at a predetermined gain. The amplified output is input to the correction optical system driving means 15. In this manner, the correction optical system 12 is driven or stopped near the center (when the subtraction circuit input is a non-signal input) on the basis of an output from the fluctuation sensor 1.

A lock member 11 is used to mechanically fix the correction optical system 12. The lock member 11 is electromagnetically driven by a lock driving means 10 in accordance with a control signal from the sequence control circuit 21. The lock member 11 is set in the unlock state when a shift system is to be operated, and is set in the lock state when the shift system is to be stopped. A shutter mechanism 16 is like one used for the exposure operation of a conventional still camera. The shutter mechanism 16 is driven at a predetermined timing via a shutter control means 17 in accordance with a control signal from the sequence control circuit 21. A feeding motor 19 is used for the film feeding operation of the still camera. As in the above case, the feeding motor 19 is driven via a feeding control means 18 in accordance with a control signal from the sequence control circuit 21. The actual movement of a film fed by the feeding motor 19 is detected by a feeding pulse detecting means 20, and a counting operation is performed by a pulse counter 23 in the sequence control circuit 21, thereby detecting that a predetermined number of frames have been wound up.

A timer circuit 22 incorporated in the sequence control circuit 21 is used to set an image blur prevention stop timing (to be described later). Switches 24 to 28 are connected to the sequence control circuit 21, as shown in FIG. 1, and used for determination of sequence operations (to be described later) in the present invention. The switch (MAIN) 24 is a main switch for inhibiting/permitting the operation of the overall camera. The switches 25 (SW1) and 26 (SW2) are switches which are turned on in the half press state and full press state of the release button, respectively. The switch 27 (ISSW) is an image blur prevention mode switch for permitting/inhibiting an image blur prevention operation. The switch 28 is a mode switch for setting the release mode to a continuous/single-frame shooting mode.

Figure 2:
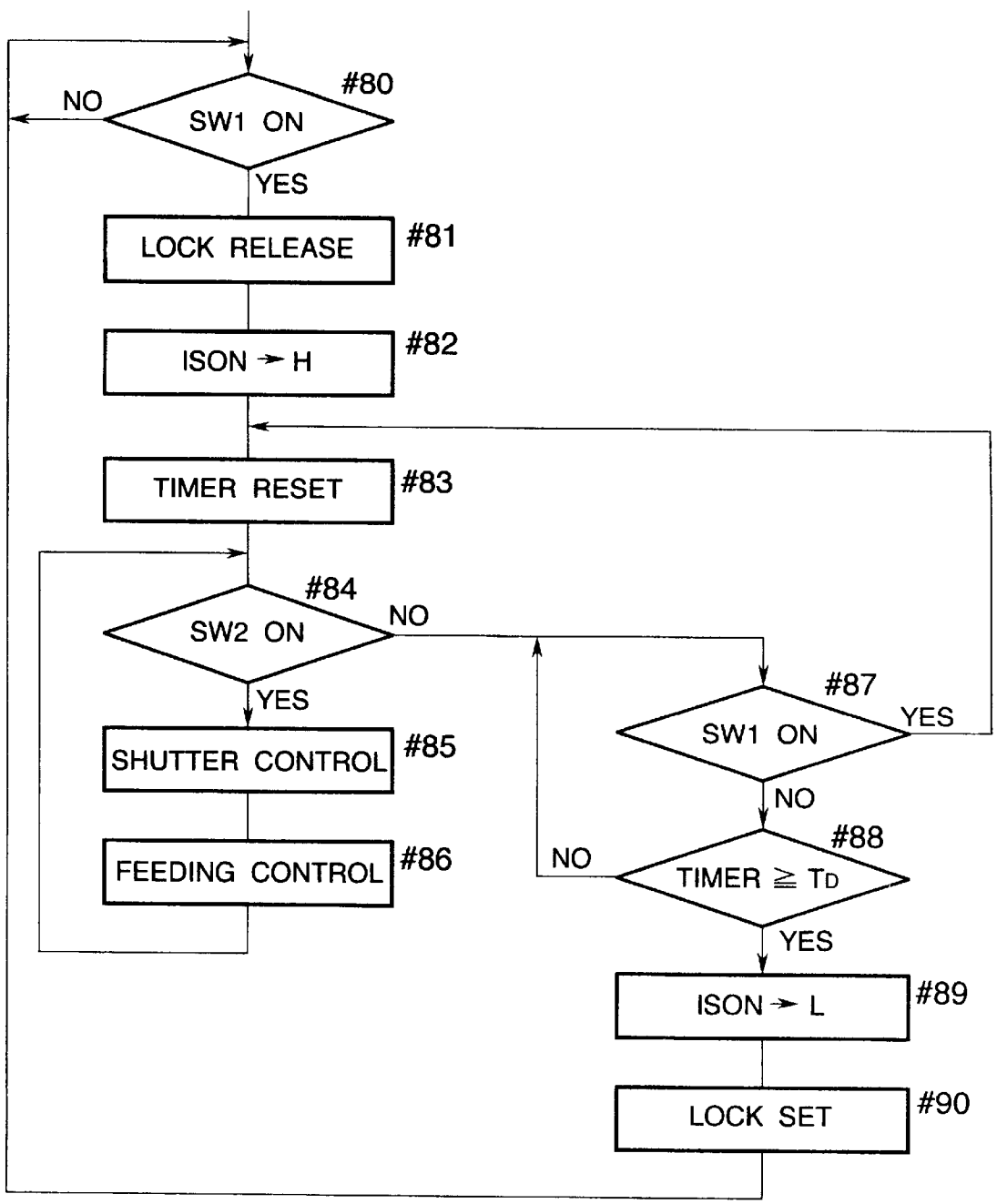
FIG. 2 is a flow chart showing the operation of a camera according to the first embodiment of the present invention.

The overall arrangement of the camera according to each embodiment has been described above with reference to the block diagram of FIG. 1. An actual operation will be described next with reference to the flow chart of FIG. 2.

In step #80, it is determined whether the switch SW1 (25 in FIG. 1) of the camera is ON. If YES in step #80, the flow advances to step #81 to operate the lock member 11 in FIG. 1 to release the lock of the correction optical system 12, thereby setting the correction optical system 12 free. In step #82, the sequence control circuit 21 outputs an "H"-level signal ISON to turn on the analog switch 4, and to also turn off the analog switch 5 via the inverter 6. In the above manner, the sequence control circuit 21 then starts driving the correction optical system 12 on the basis of an output supplied from the fluctuation sensor 1 via the integral circuit 3.

In step #83, the timer circuit 22 is reset. In step #84, the state of the switch SW2 (26 in FIG. 1) for the release start operation of the camera is determined. If the switch SW2 is ON, the flow immediately advances to step #85 to control the driving operation of the shutter mechanism 16 in FIG. 1 so as to perform an exposure operation in accordance with a predetermined shutter time/aperture value. When this shutter control operation is completed, energization to the feeding motor 19 is started in step #86. When the film is fed by a predetermined film amount, energization to the feeding motor 19 is stopped, and the flow returns to step #84 again.

If it is determined in step #84 that the switch SW2 is OFF, no release operation is performed, and the flow advances to step #87 to determine the state of the switch SW1. If the switch SW1 is ON, the flow advances to step #83 to reset the internal timer circuit 22 again.

If it is determined in step #87 that the switch SW1 is OFF, the flow advances to step #88 to determine whether the value of the timer circuit 22 has reached a predetermined time TD. If NO in step #88, the flow returns to step #87 to repeat the above operation.

When the predetermined time TD has elapsed after the switch SW1 is turned off, the flow advances from step #88 to step #89. In step #89, the sequence control circuit 21 sets the output ISON at "L" level. As a result, the analog switch 4 is turned off, and the analog switch 5 is turned on. The driving operation of the correction optical system 12 based on the output from the fluctuation sensor 1 is stopped. In step #90, the sequence control circuit 21 drives the lock member 11 via the lock driving means 10 to perform a locking operation with respect to the correction optical system 12. With this operation, the image blur prevention operation is completed.

Subsequently, the flow returns to step #80 to repeat the above operation.

As described above, in this embodiment, an image blur prevention operation is started in synchronism with a photographing operation of the camera. Even after this photographing operation is stopped, the image blur prevention operation is continued for a predetermined period of time. Therefore, even if the operation of "half press→release" of the release button is repeated in a photographic mode of performing an AF operation a plurality of numbers of times by operating the release button as in the case of depth-of-field-priority AE photography, image discontinuity caused when an image blur prevention operation is started/stopped can be prevented. This prevents the photographer from feeling a sense of incongruity in observing an image through the finder.

Second Embodiment

Figure 3:
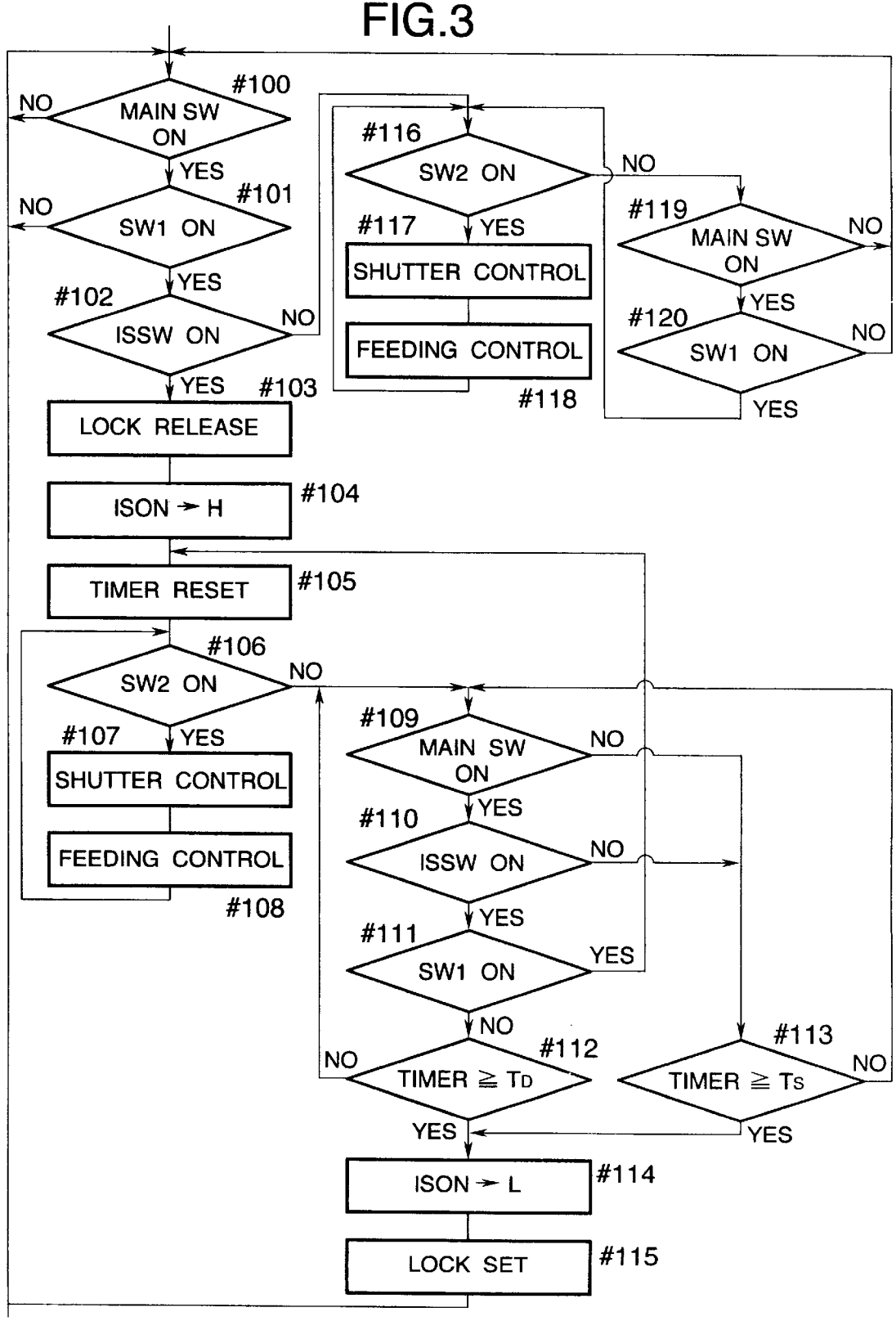
FIG. 3 is a flow chart showing the operation of a camera according to the second embodiment of the present invention.

FIG. 3 is a flow chart showing the operation of a camera having an image blur prevention function according to the second embodiment of the present invention. Note that since the circuit arrangement and the like of the camera are the same as those of the first embodiment, a description thereof will be omitted.

In step #100, it is determined whether a main switch MAIN for permitting/inhibiting the operation of the overall camera is ON. If NO in step #100, the flow waits until the switch MAIN is turned on. When the switch MAIN is turned on, the flow advances to step #101 to determine whether a switch SW1 is ON upon a half press operation of the release button of the camera. If NO in step #101, the flow returns to step #100. If YES in step #101, the flow advances to step #102 to determine whether a switch ISSW for permitting/inhibiting an image blur prevention is ON. If NO in step #102, it is determined that an image blur prevention operation is not selected. The flow then advances to step #116 to determine whether a switch SW2 is ON upon a full press operation of the release button. If YES in step #116, shutter control is performed in step #117 in the same manner as in the first embodiment. In step #118, film feeding control is performed. With this operation, the predetermined release sequence is completed.

If it is determined in step #116 that the switch SW2 is OFF, it is determined in step #119 whether the main switch MAIN is ON. If NO in step #119, the flow returns to step #100. If YES in step #119, the flow advances to step #120 to determine whether the switch SW1 is ON. If NO in step #120, the flow returns to step #100. If YES in step #120, the flow advances to step #116.

A case wherein it is determined in step #102 that the switch ISSW is ON will be described next.

In this case, the flow advances to step #103 to release the lock. The operations from step #103 to step #108 are completely the same as those from step #81 to step #86 in the first embodiment described above, and hence a description thereof will be omitted.

In step #106, it is determined whether the switch SW2 is ON. If NO in step #106, the flow advances to step #109 to determine whether the switch MAIN is ON. If NO in step #109, the flow immediately advances to step #113. If YES in step #109, the flow advances to step #110 to determine whether the switch ISSW is ON. If NO in step #110, the flow advances to step #113 as in the case wherein the switch MAIN is OFF. If it is determined in step #110 that the switch ISSW is also ON, the flow advances to step #111 to determine whether the switch SW1 is ON upon a half press operation of the release button of the camera. If YES in step #111, it is determined that the image blur prevention operation is still continued. The flow then returns to step #105. If NO in step #111, the flow advances to step #112 to determine whether the value of a timer circuit 22 is equal to or larger than a predetermined value TD.

That is, the image blur prevention operation is continued until the value of the timer circuit 22 becomes equal to or larger than the predetermined value TD even if the switch SW1 is turned off.

If it is determined in step #112 that the value of the timer circuit 22 is equal to or larger than the predetermined value TD, the flow advances to step #114 to set an output ISON at "L" level, as in the first embodiment described above, thereby stopping the driving operation of a correction optical system 12 based on an output from a fluctuation sensor 1. In step #115, the correction optical system 12 is locked, and the driving operation of a shift system is completely stopped.

If NO in step #109 or #110, the flow advances to step #113 to determine whether the value of the timer circuit 22 is equal to or larger than a predetermined value TS. If NO in step #113, the flow returns to step #109 to repeat the same operation as described above. If YES in step #113, the flow advances to step #114.

In this case, since the value TS is generally set to be smaller than the value TD, the image blur prevention operation is terminated in a period of time shorter than that in the case wherein the switch SW1 is turned off.

As described above, in the second embodiment, when a camera operation or image blur prevention operation is to be inhibited according to the photographer's intention, the image blur prevention operation is immediately stopped. For this reason, consumption of unnecessary energy can be prevented. In contrast to this, when an image blur prevention operation is to be stopped upon a release operation, the image blur prevention operation is continued for a ceratin period of time. The influence (time lag) of this stopping operation on the next photographing operation can be reduced.

A modification of the second embodiment may include an IS ON/OFF switch. While the IS ON/OFF switch is ON, an image blur prevention operation is performed regardless of the state of the switch SW1. When the IS ON/OFF switch is turned off, the flow advances to step #113. When the switch SW1 is turned off, the flow advances to step #112.

Third Embodiment

Figure 4:
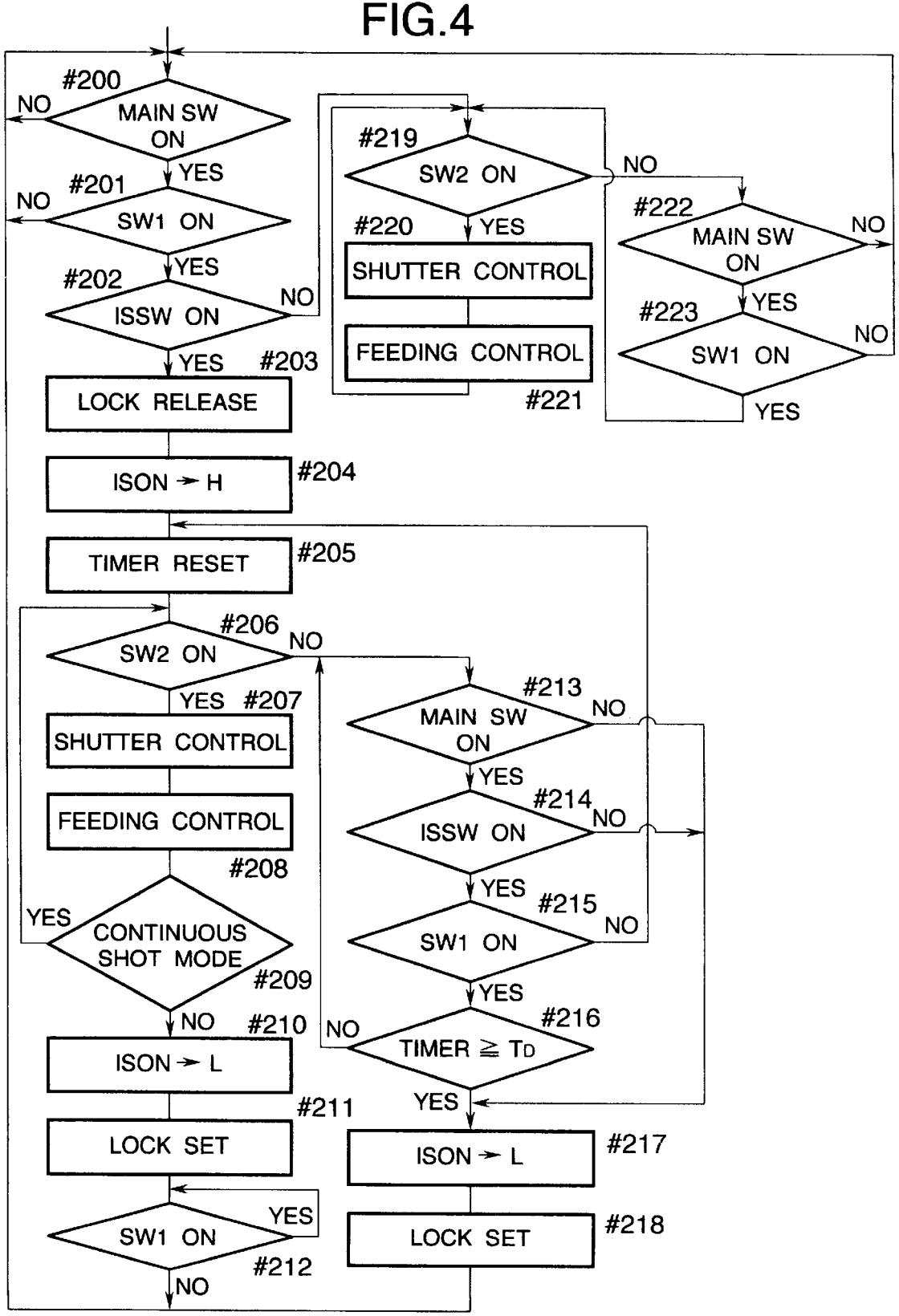
FIG. 4 is a flow chart showing the operation of a camera according to the third embodiment of the present invention.

FIG. 4 is a flow chart showing the operation of a camera having an image blur prevention function according to the third embodiment of the present invention. Note that since the circuit arrangement and the like of the camera are the same as those of the first embodiment, a description thereof will be omitted.

In the flow chart of FIG. 4, steps #200 to #208 are the same as steps #100 to #108 in the second embodiment, steps #213 to #216 are the same as steps #109 to #112 in the second embodiment, steps #217 and #218 are the same as steps #114 and #115 in the second embodiment, and steps #219 to #223 are the same as steps "116 to #120. For this reason, a description of these steps will be omitted.

If it is determined in step #206 that a switch SW2 is ON, shutter control is performed in step #207. In step #208, film feeding control is performed. In step #209, it is determined whether the continuous shooting mode is set as one of the photographic modes. If the normal single-frame shooting mode (only a photograph of one frame is taken by one release operation) is set instead of the continuous shooting mode, the flow advances to step #210 to set a switch ISON output at "L" level to stop the driving operation of a correction optical system 12 based on an output from a fluctuation sensor 1. In step #211, the correction optical system 12 is locked, and the driving operation of the shift system is stopped. As a result, the image blur prevention operation is stopped immediately after the single-frame shooting operation.

Finally, in step #212, it is determined whether a switch SW1 is OFF. When the switch SW1 is turned off, the flow returns to step #200.

If it is determined in step #209 that the current photographic mode of the camera is the continuous shooting mode, the flow returns to step #206. If it is determined in step #206 that the switch SW2 is ON, shutter control (step #207) and film feeding control (step #208) are repeated in the manner described above.

If it is determined in step #206 that the switch SW2 is OFF, the flow goes through steps #213 to #216. As a result, the image blur prevention operation is stopped a predetermined time TD after the switch SW1 of the camera is turned off (step #217→step #218).

As described above, according to the third embodiment, the duration of an image blur prevention operation upon completion of a photographing operation is changed in accordance with the photographic mode (e.g., the continuous/single-frame shooting mode) of the camera.

Therefore, prolongation of the release time lag for an image blur prevention starting/stopping operation can be prevented.

Fourth Embodiment

Figure 5:
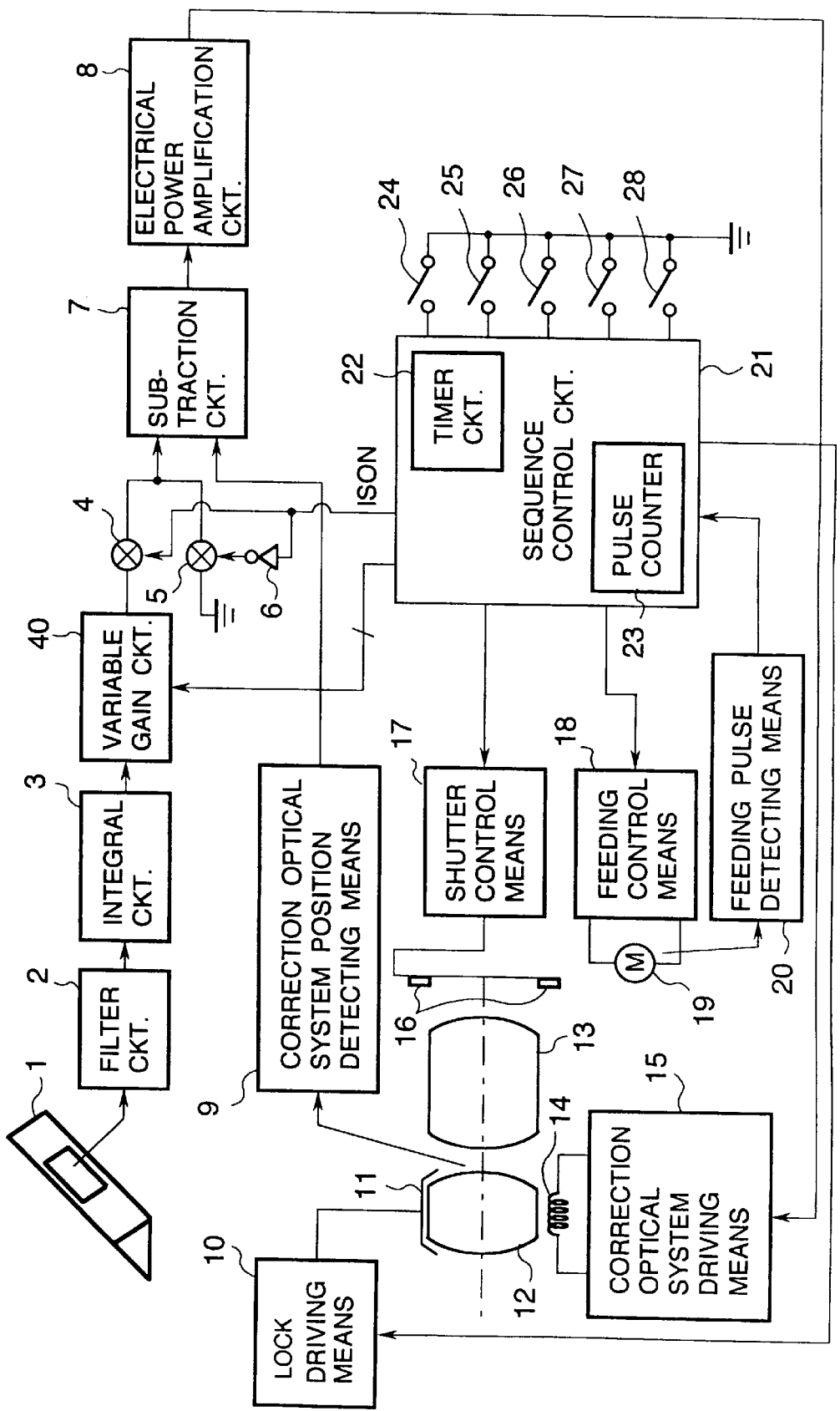
FIG. 5 is a block diagram showing the overall arrangement of a camera according to the fourth embodiment of the present invention.

FIG. 5 is a block diagram showing the arrangement of the fourth embodiment of the present invention. A signal from a gyroscope 1 is processed by a filter circuit 2, an integral circuit 3, and a variable gain circuit 40 in the order named to obtain a driving signal for a correction optical system 12. The gain of the variable gain circuit 40 is changed by the following method in accordance with a control signal from a CPU.

Figure 6:
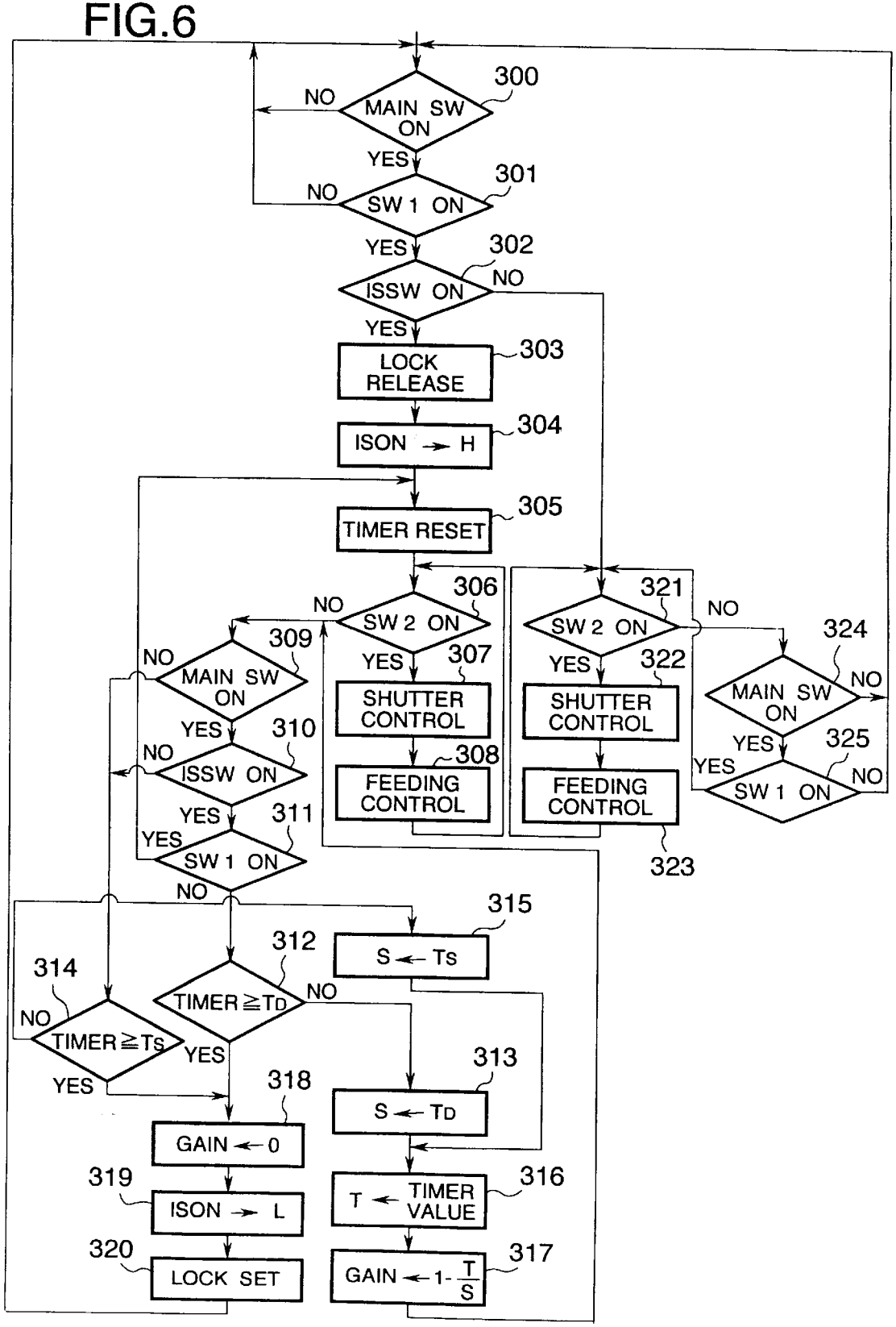
FIG. 6 is a flow chart showing the operation of the camera according to the fourth embodiment of the present invention.
Figure 7A:
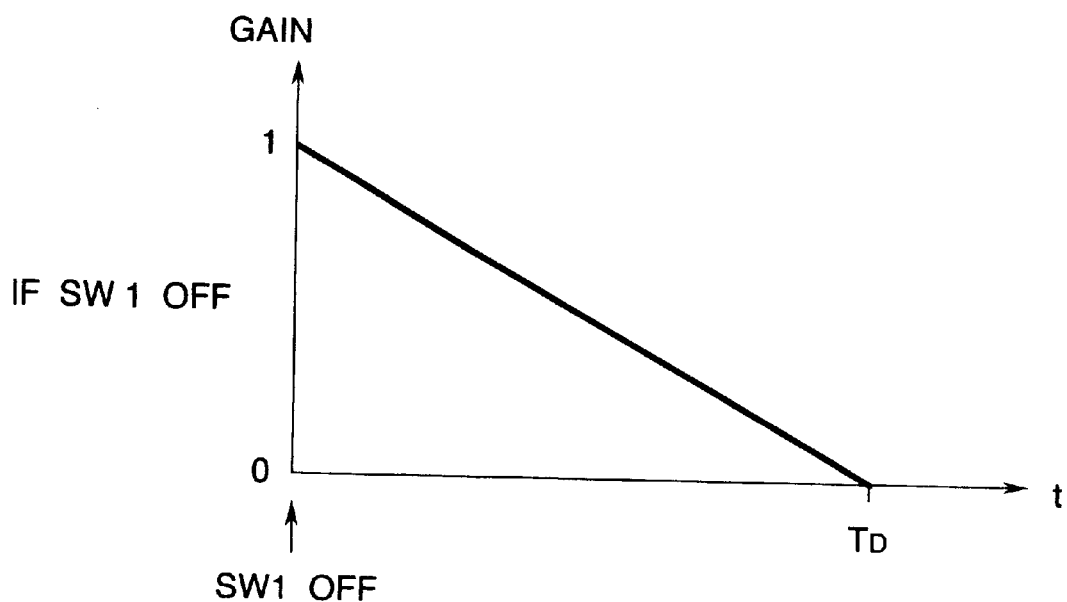
FIGS. 7A and 7B are timing charts for explaining the operation of the camera according to the fourth embodiment of the present invention.
Figure 7B:
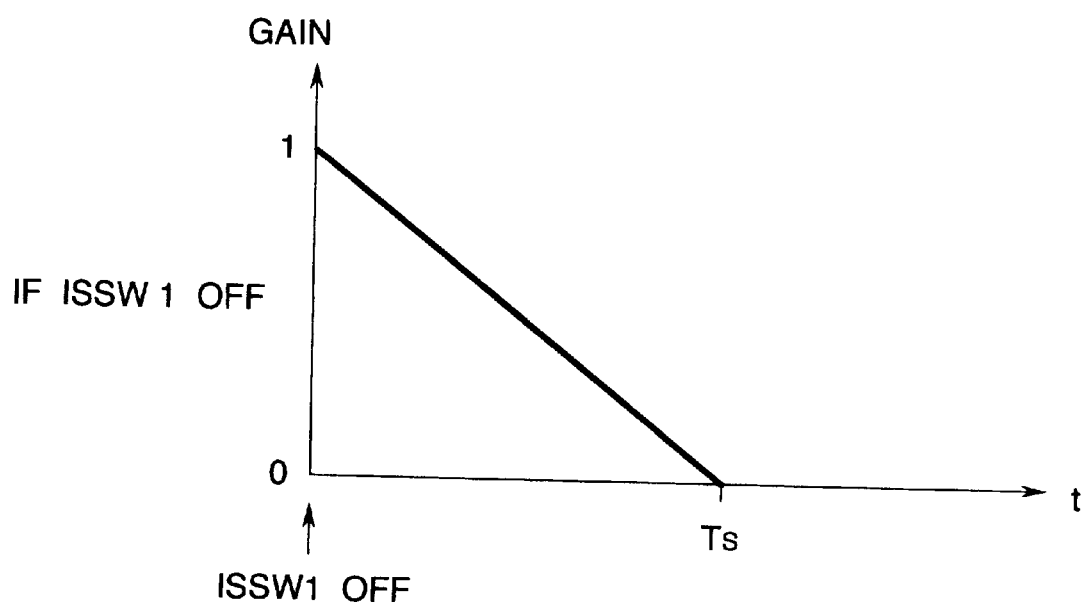
Figure 8:
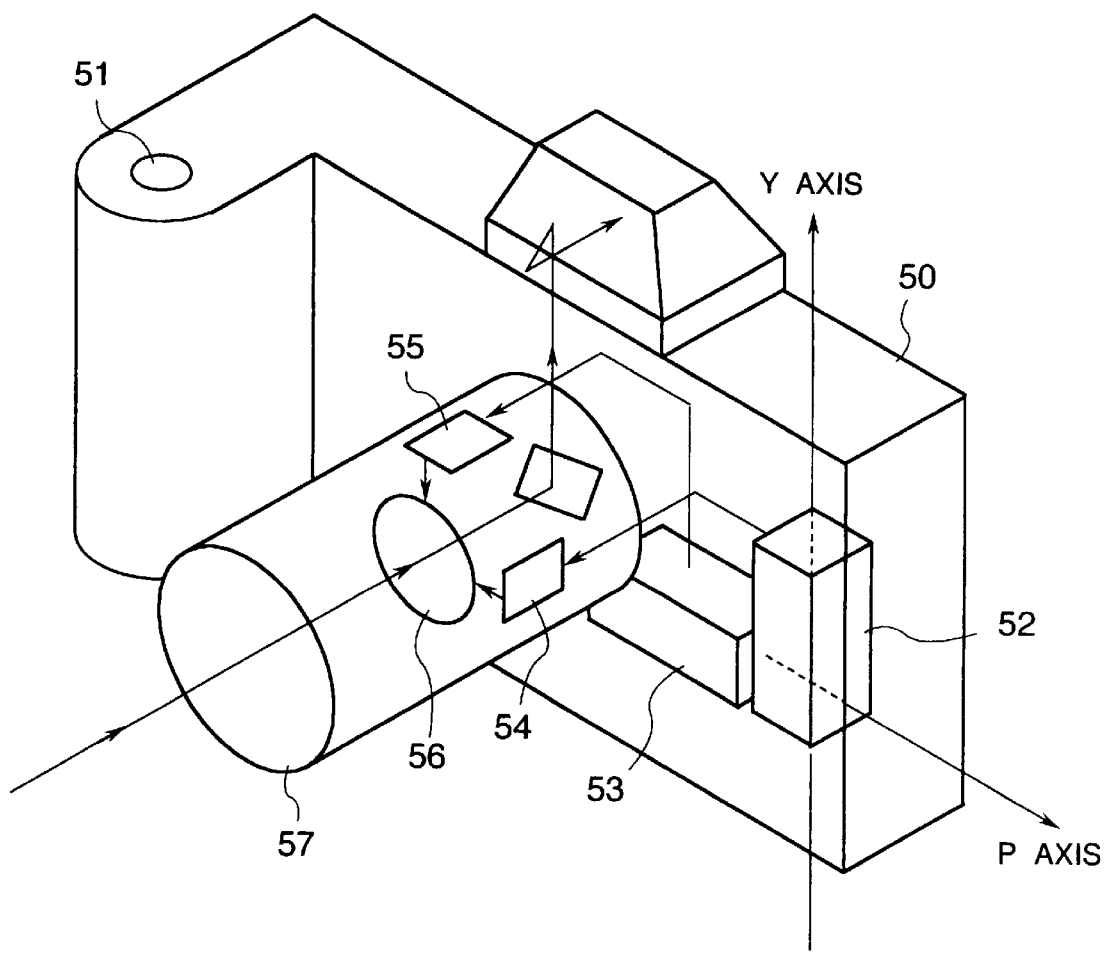
FIG. 8 is a perspective view showing the arrangement of the main part of a conventional camera having an image blur prevention function.

FIG. 6 is a flow chart for explaining the embodiment of this operation. Steps 300 to 311 are the same as steps #100 to #111. In step 312, it is determined whether the value of a timer is equal to or larger than a predetermined value TD. If NO in step 312, this predetermined value TD is latched/stored in an internal register S in step 313. In step 316, the current value of the timer is set in an internal register T. In step 317, a gain to be set in the variable gain circuit 40 described above is obtained by a calculation of "1−T/S", and the obtained value is set in the circuit 40. In this case, therefore, the gain of the variable gain circuit 40 gradually decreases from 1 until the predetermined time TD has elapsed after a switch SW1 is turned off. When it is determined in step 312 that the value of the timer is equal to the predetermined value TD, the gain is set to 0 in step 318, thereby completely stopping the driving operation of a correction system based on the signal from the gyroscope 1. In contrast to this, when a switch ISSW is turned off, the flow advances from step 310 to step 314 to determine whether the value of the timer is equal to a predetermined value TS (TS<TD), as in the above case. If NO in step 314, the flow advances to step 315 to transfer this value TS to the internal register S. In steps 316 and 317, a gain is set in the variable gain circuit 40 on the basis of this value. In this case as well, when it is determined in step 314 that the value of the timer is equal to the predetermined value TS, the flow advances to step 318 to set the final gain to 0. FIGS. 7A and 7B are graphs showing the state of the above operation (i.e., changes in gain). As described above, fluctuation correction control is terminated in different manners (in this embodiment, the degree of change in gain varies when correction is gradually stopped).

The fourth embodiment may be combined with the first to third embodiments. For example, the variable gain circuit 40 in FIG. 5 may be inserted between the integral circuit 3 and the analog switch 4 in FIG. 1. With this arrangement, when the driving operation of the correction optical system 12 is to be stopped in step #89 in FIG. 2, step #114 in FIG. 3, steps #210 and #217 in FIG. 4, and the like, the gain of the variable gain circuit 40 may be changed with the lapse of time.

In each embodiment described above, control to be performed to stop the driving operation of the correction optical system 12 has been described. However, similar control may be performed when the driving operation of the correction optical system 12 is to be started.

Each embodiment described above uses an angular velocity sensor (fluctuation gyroscope) as a fluctuation sensor. However, the present invention is not limited to this. For example, an angular acceleration sensor, an acceleration sensor, a velocity sensor, an angular displacement sensor, a displacement sensor, or a method of detecting an image fluctuation itself may be used as long as a fluctuation can be detected.

In the present invention, the fluctuation sensor and the correction means may be separately mounted on a plurality of devices on which these components can be mounted, e.g., a camera and an interchangeable lens which can be mounted thereon.

In the present invention, the arrangements or some parts thereof corresponding to the respective claims or embodiments may be arranged in separate units. For example, the correction means may be arranged in the camera body; the fluctuation sensor, in the lens barrel mounted in the camera; and the control device for controlling these devices, in the intermediate adaptor.

In the present invention, as the correction means, any means such as a shift optical system for moving an optical member within a plane perpendicular to an optical axis, a light beam changing means such as a variable angle prism, a means for moving the photographing plane within a plane perpendicular to the optical axis, or a means for correcting a fluctuation by image processing may be used as long as it can prevent an image blur.

The present invention is applied to cameras such as a single-lens reflex camera, a lens shutter camera, and a video camera according to the above description. However, the present invention can be applied to an optical device or apparatus other than cameras. In addition, the present invention can be applied as a constituent unit.

In addition, the above embodiments of the present invention or the techniques disclosed therein may be properly combined with each other.

Furthermore, while the present invention has been described with respect to what is presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the Drawings are all well-known in the camera arts and their specific construction and operation are not critical to the operation or best mode for carrying out the invention.

As has been described above, the arrangement of each embodiment of the present invention includes a timer means for starting to count at the same time a fluctuation correction operation stop is designated by a switch means, and a fluctuation correction operation control means for stopping a fluctuation correction operation performed by a correction means when the timer means counts up to a predetermined time. With this arrangement, an image blur prevention operation is continued for a predetermined period of time even after a fluctuation correction operation stop is designated.

Even if image blur prevention operation start and stop are repeated, image discontinuity caused by this repetition can be eliminated.

In addition, the present invention includes a first timer means for starting to count at the same time a fluctuation correction operation stop is designated by a first switch means, a second timer means for starting to count at the same time a fluctuation correction operation stop is designated by a second switch means, and completing the time counting operation in a time different from the time during which the first timer means performs a counting operation, and a fluctuation correction operation control means for stopping a fluctuation correction operation performed by a correction means when the counting operation of the first or second timer means is completed. With this arrangement, the duration of a fluctuation correction operation performed by the correction means is changed depending on the type of switch means associated with an image blur prevention operation, e.g., whether a fluctuation correction operation stop is designated by a switch means interlocked with the operation of a release button, an image blur prevention switch, or a main switch means in a camera.

This arrangement prevents an unnecessary image blur prevention operation and unnecessary consumption of energy, and can reduce adverse effects on the next photographing operation.

Furthermore, in the present invention, a timer means starts to count at the same time a fluctuation correction operation stop is designated by a switch means. The duration of the time counting operation performed by the timer means is changed in accordance with the detection state of a mode detection means. A fluctuation correction operation control means stops a fluctuation correction operation performed by a correction means when the time counting operation of the timer means is completed. With this arrangement, the duration of an image blur prevention operation after designation of a fluctuation correction operation stop is changed depending on whether the camera is set in the continuous shooting or single-frame shooting mode.

Even if, therefore, a photographing operation or the like is performed after an image blur prevention operation is stopped, prolongation of a time lag upon stopping of an image blur prevention operation can be prevented even if the next photographing operation or the like is performed after the image blur prevention is stopped.

What is claimed is:

1. An apparatus adapted for use with an image blur prevention device of a camera, said apparatus comprising:

first stop control means for stopping an image blur prevention operation of said image blur prevention device in a first stop operation manner wherein, in response to a predetermined release operation of a release operation portion of the camera, timing means counts a predetermined time in response to the predetermined release operation of the release operation portion and stops the image blur prevention operation after the predetermined time is counted by said timing means; and second stop control means for stopping the image blur prevention operation of said image blur prevention device in response to a predetermined operation of an operation portion of the camera other than said release operation portion in a second stop operation manner different from said first stop operation manner.

2. An apparatus according to claim 1, wherein said first stop control means comprises means for setting the image blur prevention device in a non-active state in the first stop operation manner, and said second stop control means comprises means for setting the image blur prevention device in the non-active state in the second manner.

3. An apparatus according to claim 1, wherein said first stop control means comprises means for setting the image blur prevention device in a non-active state in response to the predetermined release operation of the release operation portion after the predetermined time has elapsed after the predetermined release operation of the release operation portion.

4. An apparatus according to claim 3, wherein said second stop control means comprises means for setting the image blur prevention device in the non-active state in response to the predetermined operation of the operation portion other than the release operation portion before the predetermined time has elapsed after the predetermined operation of the operation portion other than the release operation portion.

5. An apparatus according to claim 4, wherein said second stop control means comprises means for setting the image blur prevention device in the non-active state substantially immediately in response to the predetermined operation of the operation portion other than the release operation portion.

6. An apparatus according to claim 3, wherein said first stop control means comprises means for setting the image blur prevention device in the non-active state in response to an operation of a first operation unit associated with photography.

7. An apparatus according to claim 6, wherein the first operation unit is a release operation unit.

8. An apparatus according to claim 6, wherein said second stop control means comprises means for setting the image blur prevention device in the non-active state in response to an operation of a second operation unit, which is different from the first operation unit associated with photography and is used to determine a state of the image blur prevention device, before a predetermined time has elapsed after the predetermined operation of the second operation unit.

9. An apparatus according to claim 8, wherein the second operation unit is a main switch of the image blur prevention device.

10. An apparatus according to claim 1, wherein the release operation portion of the camera is a button.

11. An apparatus according to claim 1, wherein the operation portion other than the release operation portion is a main switch of the image blur prevention device.

12. An image blur prevention apparatus comprising:

an image blur prevention device for preventing image blur;

first stop control means for stopping an image blur prevention operation of said image blur prevention device in a first stop operation manner wherein, in response to a predetermined release operation of a release operation portion of the camera, timing means counts a predetermined time in response to the predetermined release operation of the release operation portion and stops the image blur prevention operation after the predetermined time is counted by said timing means; and second stop control means for stopping the image blur prevention operation of said image blur prevention device in response to a predetermined operation of an operation portion of the camera other than said release operation portion in a second stop operation manner different from said first stop operation manner.

13. An optical apparatus to which an image blur prevention device is adapted, said optical apparatus comprising:

first stop control means for stopping an image blur prevention operation of said image blur prevention device in a first stop operation manner wherein, in response to a predetermined release operation of a release operation portion of the camera, timing means counts a predetermined time in response to the predetermined release operation of the release operation portion and stops the image blur prevention operation after the predetermined time is counted by said timing means; and second stop control means for stopping the image blur prevention operation of said image blur prevention device in response to a predetermined operation of an operation portion of the camera other than said release operation portion in a second stop operation manner different from said first stop operation manner.

14. An apparatus adapted for use with an image blur prevention device of a camera, said apparatus comprising:

detection means for detecting a change in an operation state of a predetermined operation portion; and stop control means for stopping an image blur prevention operation of said image blur prevention device in response to a change in the operation state detected by said detection means, said stop control means including timing means for counting time in response to a chance in the operation state detected by said detection means, means for stopping the image blur prevention operation after a predetermined time is counted by said timing means, and means for maintaining the image blur prevention device in an operation state similar to the operation state of said image blur prevention device just prior to a chance in the operation state detected by said detection means until said timing means counts said predetermined time.

15. An apparatus according to claim 14, wherein said timing means is a timer.

16. An apparatus according to claim 15, wherein said stop control means includes means for initiating a stop operation when said timing means counts to the predetermined time.

17. An apparatus according to claim 14, wherein the image blur correction device comprises means for optically correcting image blur.

18. An apparatus according to claim 14, wherein the image blur detection device comprises means for detecting a fluctuation of an apparatus.

19. An image blur correction apparatus comprising:

an image blur correction device for correcting image blur in accordance with an output from an image blur detection device for detecting an image blur state;

detection means for detecting a change in an operation state of a predetermined operation portion; and stop control means for stopping an image blur prevention operation of said image blur prevention device in response to a change in the operation state detected by said detection means, said stop control means including timing means for counting time in response to a change in the operation state detected by said detection means, means for stopping the image blur prevention operation after a predetermined time is counted by said timing means, and means for maintaining the image blur prevention device in an operation state similar to the operation state of said image blur prevention device just prior to a chance in the operation state detected by said detection means until said timing means counts said predetermined time.

20. An optical apparatus to which an image blur correction apparatus having an image blur correction device for correcting image blur in accordance with an output from an image blur detection device that detects an image blur state is applied, said apparatus comprising:

detection means for detecting a change in an operation state of a predetermined operation portion; and stop control means for stopping an image blur prevention operation of said image blur prevention device in response to a change in the operation state detected by said detection means, said stop control means including timing means for counting time in response to a change in the operation state detected by said detection means, means for stopping the image blur prevention operation after a predetermined time is counted by said timing means, and means for maintaining the image blur prevention device in an operation state similar to the operation state of said image blur prevention device just prior to a change in the operation state detected by said detection means until said timing means counts said predetermined time.

21. An apparatus according to claim 1, wherein said second stop control means stops the image blur prevention operation before a second predetermined time elapses after the predetermined operation of said operation portion other than the release operation portion.

22. An apparatus according to claim 1, wherein said second stop control means stops said image blur prevention operation after a second predetermined time, shorter than said predetermined time, elapses after the predetermined operation of said operation portion other than the release operation portion.

* * * * *

UNITED STATES PATENT AND TRADEMARK OFFICE
CERTIFICATE OF CORRECTION

PATENT NO. : 5,933,660

DATED : August 3, 1999

INVENTOR(S): YASUHIKO SHIOMI

It is certified that error appears in the above-identified patent and that said Letters Patent is hereby corrected as shown below:

COLUMN 6,
Line 10, "ceratin" should read --certain--; and
Line 32, ""116" should read --#116--.

COLUMN 7,
Line 13, "embodiment" should read --operation--; and
Line 14, "operation." should read --embodiment.--.

COLUMN 11,
Line 18, "chance" should read --change--.

COLUMN 12,
Line 7, "chance" should read --change--.

Signed and Sealed this

Fourth Day of April, 2000

Attest:

Q. TODD DICKINSON

*Attesting Officer*     *Director of Patents and Trademarks*